No. 646,889. Patented Apr. 3, 1900.
A. SUNDH.
CONTROLLER FOR ELECTRIC RAILWAY CARS.
(Application filed Dec. 23, 1899.)

(No Model.) 7 Sheets—Sheet 1.

WITNESSES:
INVENTOR
ATTORNEY

No. 646,889. Patented Apr. 3, 1900.
A. SUNDH.
CONTROLLER FOR ELECTRIC RAILWAY CARS.
(Application filed Dec. 23, 1899.)
(No Model.) 7 Sheets—Sheet 2.

Fig. 2.

WITNESSES:
James F. Duhamel
C. Sedgwick

INVENTOR
August Sundh
BY A. P. Thayer,
ATTORNEY

No. 646,889. Patented Apr. 3, 1900.
A. SUNDH.
CONTROLLER FOR ELECTRIC RAILWAY CARS.
(Application filed Dec. 23, 1899.)
(No Model.) 7 Sheets—Sheet 4.

WITNESSES
James F. Duhamel.
C. Sedgwick

INVENTOR
August Sundh.
BY
A. P. Thayer
ATTORNEY

No. 646,889. Patented Apr. 3, 1900.
A. SUNDH.
CONTROLLER FOR ELECTRIC RAILWAY CARS.
(Application filed Dec. 23, 1899.)
(No Model.) 7 Sheets—Sheet 6.

WITNESSES: INVENTOR
August Sundh
BY
ATTORNEY

No. 646,889. Patented Apr. 3, 1900.
A. SUNDH.
CONTROLLER FOR ELECTRIC RAILWAY CARS.
(Application filed Dec. 23, 1899.)
(No Model.) 7 Sheets—Sheet 7.

WITNESSES
INVENTOR
August Sundh
BY
A. P. Thayer
ATTORNEY

UNITED STATES PATENT OFFICE.

AUGUST SUNDH, OF YONKERS, NEW YORK.

CONTROLLER FOR ELECTRIC-RAILWAY CARS.

SPECIFICATION forming part of Letters Patent No. 646,889, dated April 3, 1900.

Application filed December 23, 1899. Serial No. 741,381. (No model.)

*To all whom it may concern:*

Be it known that I, AUGUST SUNDH, a citizen of the United States of America, and a resident of Yonkers, county of Westchester, and State of New York, have invented certain new and useful Improvements in Controllers for Electric-Railway Cars, of which the following is a specification.

This invention, which embraces a variety of devices susceptible of employment either separately or collectively, includes among other features the equipment of an electric-railway train with appliances whereby all the car-propelling motors of the train may be simultaneously stopped or started in either direction or be otherwise synchronously governed in their action by a peculiarly-constructed manually-operative electric governor or governors on any one or more of the car-platforms; also, devices whereby like results may be manually effected by mechanical means, and also the equipment of each car with an air-brake and air-brake-operating mechanism controlled by said manually-operative electric governor and combined with means for reversing the car-motors in case of emergency, if desired, without releasing the brakes.

The accompanying illustrative drawings are as follows.

An electric-railway train employing the present improvements is composed of a plurality of suitably-coupled-together cars $a$ $a$, each provided with the propelling-motors $b$ $b$, which are supplied with the electric current from the main line through any desired one of the usual multiplicity of branch circuits, according to the adjustment of an ordinary circuit-changer—such, for example, as the barrel-switch $c$. The barrel-switch $c$ is turned upon its axis in either direction and to the extent necessary to conduct the current to the desired one of the several branch circuits by means of a train $c'$ of gearing connecting its shaft $c^2$ to the switch-actuating rock-shaft $d$, which is arranged beneath the body of the car and extends from end to end thereof.

When a plurality of cars are associated in a train, their several switch-actuating shafts are united between the cars by flexible couplings—such as, for example, the coupling $d'$—and are thus made to become sections of a continuous train-shaft $x$, rotatable as a unit. Hence whenever the train-shaft $x$ is rotated in its bearings to a given extent in either direction the barrel-switches of all the cars in the train are simultaneously rotated in one direction and to like extent.

At each car-platform there is mounted a vertical shaft $d^2$, provided with a hand-wheel $d^3$. The lower end of the vertical shaft $d^2$ is geared by the bevel-gears $d^4$ to the switch-actuating shaft $d$ of the car. Thus the switch-actuating shaft $d$ can be mechanically operated by manual power applied to the hand-wheel $d^3$.

An important feature of the present invention consists of means for electrically operating and governing the operation of the switch-actuating shaft $d$, and hence of course the train-shaft $x$, when a plurality of cars are coupled together. For this purpose one or each of several cars composing the train is equipped with an electric motor $d^5$, geared to its switch-actuating shaft $d$ and having independent field-coils $1^\times 2^\times$, wound in relatively-opposite directions and included in two branch circuits, whereby the rotation in one direction of the switch-actuating shaft $d$ and the barrel-switch $c$ will be effected and continued so long as the operating-current is supplied to the motor $d^5$ through one of said branch circuits, and the rotation in the opposite direction of the switch-actuating shaft $d$ and the barrel-switch $c$ will be effected and continued so long as the operating-current is supplied to the motor $d^5$ through the other of said branch circuits.

Figures 4, 5, 6, 7, 8, 9, 10:
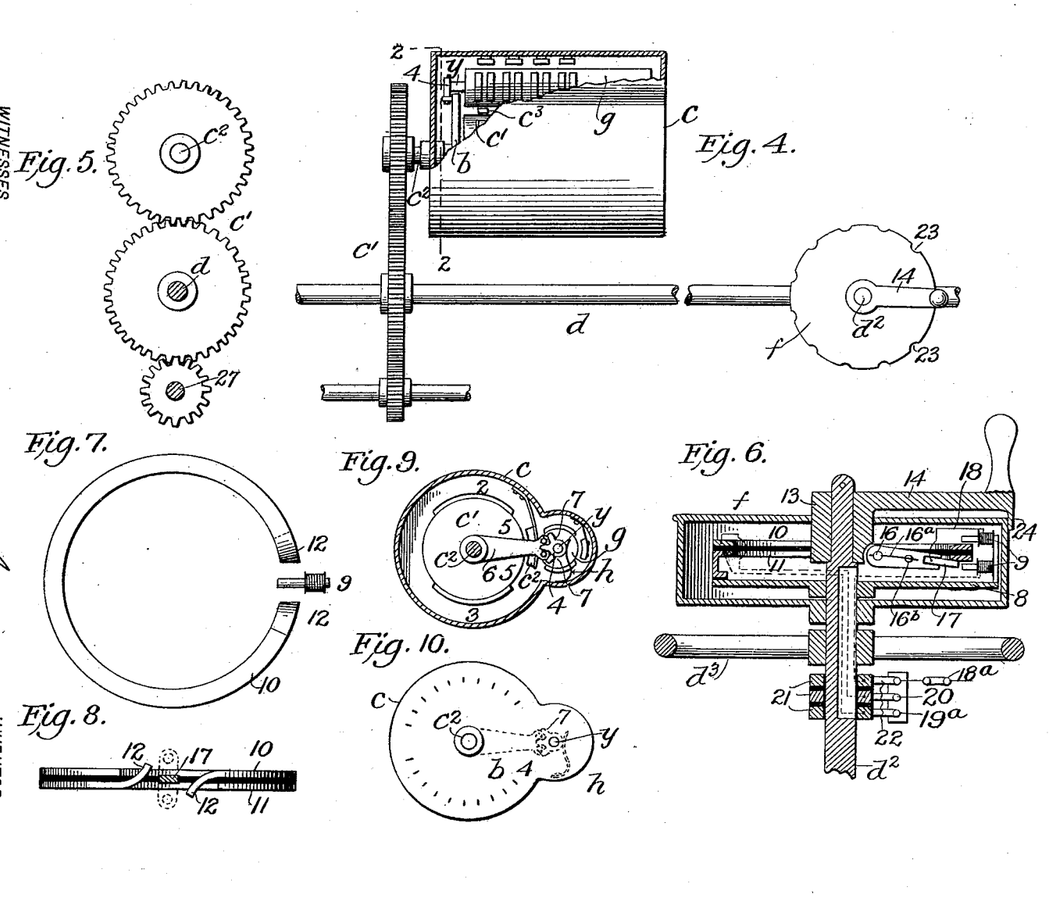
Fig. 4 is a top view of the barrel-switch, partly in section, also showing broken-out portions of the train-shaft, the gearing for actuating the barrel-switch, and affording a top view of the "governor.
" Fig. 5 is a face view of the train of gear for actuating the barrel-switch and the train-shaft from the train-shaft-actuating motor.
Fig. 6 is a central vertical section of the governor and its immediate connection.
Fig. 7 is a top view of the superposed contact-strips constituting the movable terminals of the two branch circuits which are combined with the governor.
Fig. 8 is an edge view of said contact-strips.
Fig. 9 is a transverse section of the barrel-switch, taken through the plane indicated by the dotted line 2 2 on Fig. 4.
Fig. 10 is an end elevation of the barrel-switch with the gear-wheel of Fig. 4 omitted.
Figure 11:
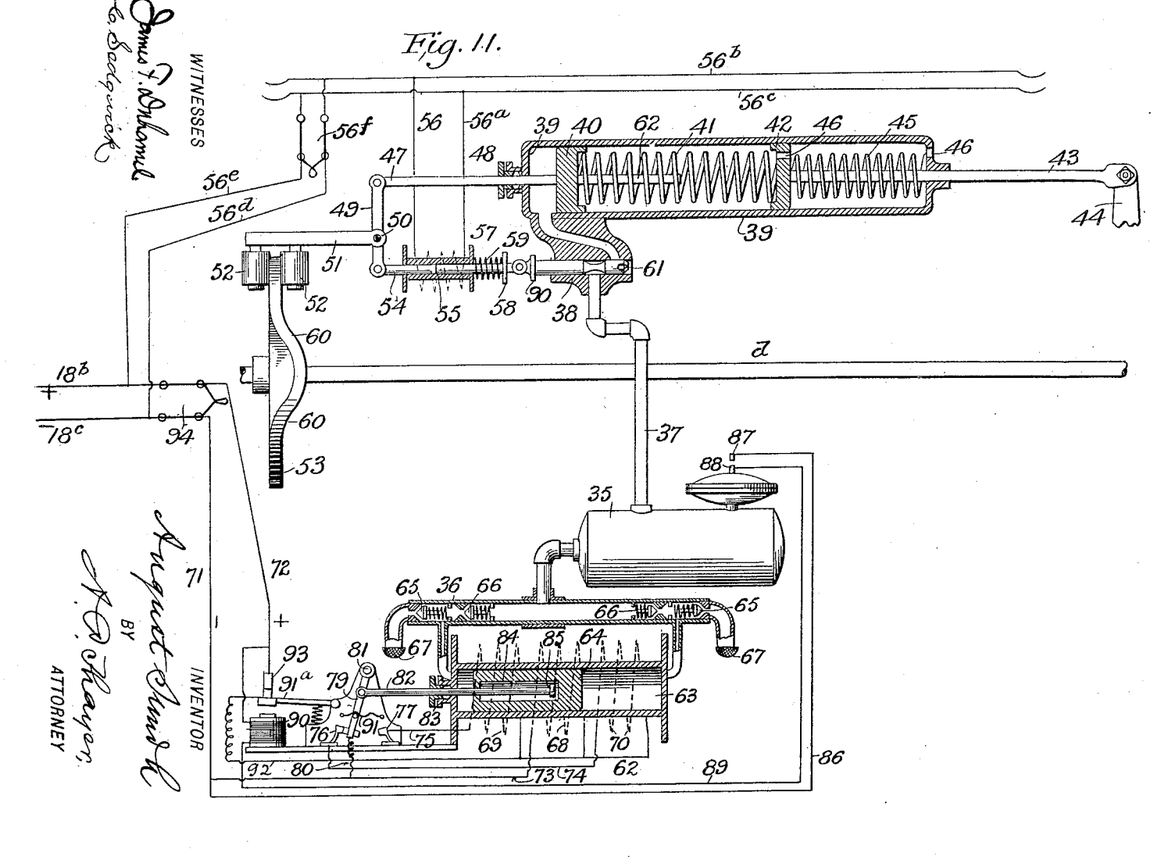
Fig. 11 is a top view of the air-brake mechanism, partly in section.
Figures 15, 16:
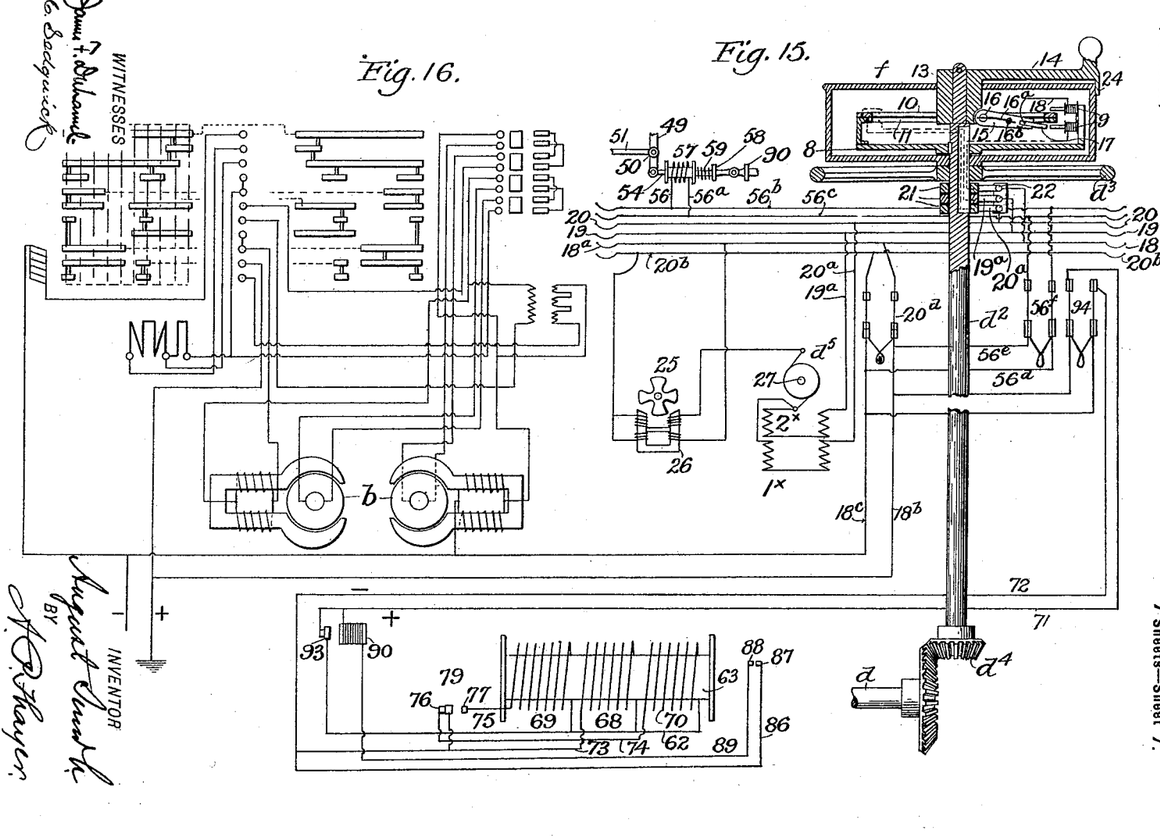
Fig. 15 is a sectional elevation of the governor for operating and governing the barrel-switch and a diagram of the wire system of the motor for effecting the rotation of the barrel-switch, also of the wiring of the air-brake apparatus.
Fig. 16 is a diagram of the series-parallel barrel-switch contacts and circuit-wires for controlling the main driving-motors.

For governing the extent to which the motor $d^5$ is electrically rotated and also governing the direction of such rotation each car-platform is equipped with a governor consisting of a manually-rotatable circuit-closer which is contrived with two correspondingly-rotatable contact-strips, respectively forming the terminals of said branch circuit, the construction being as follows: Within a circular inclosing and protecting case $f$ of this governor, mounted fixedly upon any suitable supports, so that shaft $d^2$ extends upward through it centrally in a way allowing the shaft to turn freely, a disk 8 is keyed to the shaft next above the bottom of the case, on which a blow-out magnet 9 is mounted, also two contact-strips 10 and 11, said strips being placed side by side, but insulated from each other and also from the disk. They are parallel with the disk in a plane that is central between the two coils of the magnet. The blow-out magnet is to disrupt the arcs that occur when the current is broken. There is a gap in the strips 10 and 11, as shown in Figs. 7 and 8, and the extremity 12 of each strip is bent laterally across the plane of the other strip respectively. The hub 13 of the crank-handle 14 is pivoted to the upper end of shaft $d^2$ and extends into the case a little beyond the plane of the contact-strips 10 11 and carries the radially-projecting switch 15, pivoted to it at 16 in the central plane of the said strips, so that the outer extremity of the switch can swing through the gap in the strips from the outside of one strip to the outside of the other strip. A spring $16^a$, set in a slit in the non-rotating pivot-pin 16 and connected to the switch at $16^b$, centers the switch in the gap when the switch stands at the gap and also presses the switch-contact on the contact-strips. The switch 15 carries the insulated contact 17 in its outer end, to which the current-supplying wire 18, which is first wound around the blow-out magnet, is connected. The wire 18 is connected to wire $18^a$ of the train-circuit through brush 22. The wires $18^b$ and $18^c$ represent the controlling-circuit supplying the current to train-wires $18^a$ and $20^b$. A circuit closing and breaking switch $20^d$ is provided in this controlling-circuit for cutting out the governor when required. The strips 10 and 11 are respectively connected to the fields of motor $d^5$ by the train-wires 19 and 20 through branches $19^a$ and $20^a$, the motor being wound, as indicated in the diagram of Fig. 15, for causing it to rotate in opposite directions, according as the current is directed through one or the other of the strips by the switch.

It will be seen that by turning the crank-handle 14 to the left the contact 17 will bear on the upper side of strip 10 and the circuit will be closed through it and wire 19, and by turning it to the right the circuit will be closed through strip 11 and wire 20, thus causing the motor $d^5$ to turn either way, as desired, and both circuits will be broken when the contact stands in the gap of the strips out of contact with both.

Suitable rotating contacts 21 are employed in connection with brushes $19^a$, $20^a$, and 22 for connecting the circuit-wires with the rotating parts of the governor, said contacts 21 being suitably insulated from shaft $d^2$.

The cover-plate of the case of the governor has a series of stop-notches 23, gaged correspondingly with the contacts of the barrel-switch $c$, and the crank-handle 14 has a stop-finger 24, adapted to be forced along the notches with sufficient grip to hold the crank-handle wherever it may set.

By shifting the crank-handle 14 over to any of the setting-points either way the switch 14 is similarly shifted along one of the strips 10 or 11, closing the circuit of the motor $d^5$, by which it will be set in motion, so as to turn the barrel-switch $c$ in the same direction, and it also turns the train-shaft $x$ and shaft $d^2$ in the direction causing the gap in the contact-strips to follow the switch and break the circuit. The motor $d^5$ then stops and the main motor-circuit thus closed by the barrel-switch remains closed and the operation of the car continues. Further shifting of the crank-handle one way or the other causes corresponding changes of the motor-switch as it may be desired to vary the current, and return of the crank-handle to the middle position causes return of the barrel-switch to the middle position, which breaks the main motor-circuit and stops the car. It will now be seen that by the shafts $d$ thus coupled in a train-shaft $x$ and geared with the barrel-switches $c$, respectively, unity of action of the switches may be had, so that the motors of the several cars will be controlled alike at all times and will do their respective portions of work, which will thus be equally distributed among them. To enable the motor-switches to be thus operated, the contact drum or barrel $c'$ of the switch is provided with duplicate sets of contacts of the character represented in the diagram of Fig. 16 on opposite sides, respectively, as indicated at 2 and 3 in Fig. 9, and the drum is adapted to make electrical connection with brushes $c^3$ through one or the other, whereby being turned one way from the middle position, Fig. 9, it will direct the power-current through the motors for running in one direction and turned the other way from said middle position will cause the reverse movement of the motors, the distributions of current being alike through each range of contacts. In order to direct the current, an ordinary reversing-switch $g$ is provided, said reversing-switch being controlled by an arm 6, connected to the shaft $c^2$, which takes effect on the toothed segment 4 on the switch-shaft $y$ of switch $g$ when passing the middle or neutral position and turns the switch. The segment 4 has two faces 7, on which a spring $h$ bears respectively to hold the segment in position for receiving the spurs 5 of the arm 6 when returning to the middle position.

Referring to the diagram 16, the following are the combinations of contacts effected for distributing the current—viz., No. 1, two motors in series, all resistance in; No. 2, two motors in series, half resistance in; No. 3, two motors in series, no resistance in; No. 4, two motors in series, shunt around field; No. 5, two motors in series, half resistance in; No. 6, one motor cut out, half resistance in; No. 7, one motor cut out, half resistance in; No. 8, motors in parallel with, half resistance in series; No. 9, motors in parallel with, no resistance in series; No. 10, motors in parallel with, shunt resistance around field.

It is preferable to gear the shafts $d^2$ and $d$ so as to make the labor as easy as possible for the operator when necessary to operate the train-shaft by hand. This may be done to the extent of doubling the leverage by gearing said shafts in the proportions of two to one, as shown in Fig. 15, and thus allowing a complete revolution of the handle 14 to the half-revolution of shafts $d$. The notch-scale 23 for the handle 14 is proportionately extended for the increased range of the handle, as shown in Fig. 4, and the first notch each side of the middle space is the unit of the scale in that direction, the said scale serving for both movements of the handle.

An electromagnetic brake, consisting of the rotating armature 25 and magnet 26, is employed in connection with the armature 27 of motor $d^5$ to prevent it from overrunning by its inertia, and thus shifting the motor-controller too far. The magnet 26 is wound with neutralizing-coils, rendering it of no effect while the current is on the motor; but when the motor-current is interrupted the current yet contained in the lower coil and then exciting the magnet polarizes the magnet, which acts as a brake to resist the movement of the armature.

Figure 14:
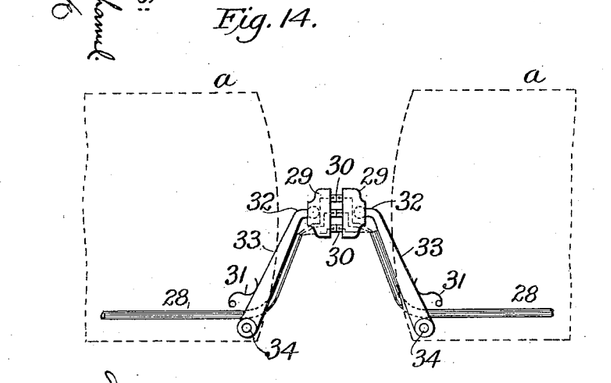
Fig. 14 represents contacts for coupling the train circuit-wires when the cars are coupled.

The hand-wheel $d^3$ of shaft $d^5$ is an emergency device for operating the barrel-switch by hand in case the governor should fail to act at any time. Thus the car can be operated individually by the governor the same as by the usual barrel-switch, and it will be seen that with the train-wires $18^a$, 19, and 20, also $20^b$, of a train of cars so equipped coupled together from car to car and the train-shafts also coupled, as before stated, all the barrel-switches can be operated in unison by a single governor anywhere along the train. For this purpose the said wires are arranged in cables 28, Fig. 14, terminating at each of the car ends in suitable coupling-blocks 29, wherein the wires are separated and each provided with contacts 30, adapted to be maintained in contact by the pressure of suitable springs, as 31, when the cars are coupled and to separate automatically when the cars are uncoupled. The blocks 29 are mounted by ball-and-socket joints 32 on the extremities of arms 33, pivoted at 34 and carrying said blocks in the center line of the cars or thereabout for most favorable articulation of the couplings to accommodate the variations of the ends of the cars relatively to each other. The springs 31 bear against the arms 33 to maintain the connection of the contacts. Any other mode of connecting the wires may be employed, as found best.

Although the motor $d^5$ is necessary in each car to enable the car to be operated individually by the governor, it will be seen that in a train having the train-shaft coupling the barrel-switches with one or more governors one motor $d^5$, capable of operating all the barrel-switches in the train, will serve as well, and where trains generally consist of a certain number of cars it may be desirable to omit the motors $d^5$ in all except, say, the end cars of the train, and the same may be done with the governors, only one at each end of the train being necessary in such cases. My invention includes such an arrangement. In such a train system it is important to have an automatic brake system in which the brakes may be similarly controlled for uniform action through the train or on a plurality of cars in the train, and to this end I have provided air-brake apparatus for each car subject to control by the train-shaft in such manner that action of the brakes can be effected through the instrumentality of the governor after the main motor-current has been turned off either for gradual action or action in full force and so that in case a car breaks loose from the train and from the control of the governor its brakes will be instantly applied with full force, and the brakes may also in an emergency be applied in full force when it may be desirable to reverse the motors suddenly, as to avoid a collision. Each car is provided with a compressed-air-holding tank 35 to be supplied by any suitable air-compressing pump, as 36, from which air is to be admitted through pipe 37 and a controlling-valve 38 to the brake-cylinder 39 behind the piston 40, which acts through a powerful coiled-wire compression-spring 41 on another piston 42 in said cylinder 39 and attached to a rod 43, connected with the brake-lever 44. A retracting compression-spring 45 is placed between piston 42 and the end of the cylinder, through which rod 43 extends to relieve the brakes and facilitate return of piston 40. This end of the cylinder and piston 42 are provided with vent-holes 46. The rod 47 of piston 40 extends through a stuffing-box 48 in the end of the cylinder and is connected with the long arm of lever 49, having a fulcrum-pivot 50 on one end of a connecting-rod 51, coupled by roller-studs 52 with a cam-disk 53 on the shaft $d$. The short arm of lever 49 is pivoted to one end of the rod 54, by which valve 38 is operated. This rod is divided at 55 into two parts. One part is fixedly attached to the solenoid-cylinder 57, and the other part forms the soft-iron core of a solenoid connected in the branch circuit 56 $56^a$ of the train-wires $56^b$ and $56^c$, connected with the controlling-circuit by the wires $56^d$ and $56^e$, in which is a circuit closing and breaking switch $56^f$.

When the car is in operation and the circuit is closed through the solenoid, the two parts of the rod are joined and operate as a solid rod. Between one end of the solenoid-cylinder 57 and a collar 58 of rod 54 is a compression-spring 59, which in case a car breaks loose from the train and the solenoid-circuit is consequently broken shifts the valve 38 forward, and thereby opens communication between tank 35 and the brake-cylinder and puts on the brakes.

The relation of the governor $f$ and the switch $c$ is such that the main motor-current is off when lever 14 is in any position intermediately of the extremities of the series of notches 23, Fig. 4, and the relation of the cam-disk 53 to these parts is such that its operation begins whenever lever 14 moves toward the middle position from either direction. When either of the inclines 60 enters between the roller-studs 52, the current being on the solenoid and the rod 54 acting as an entirety, the valve 38 is shifted to the right, its movement being easier than that of piston 40, opening the inlet for air more or less, according as crank 14 is shifted toward the middle position. The air thus admitted onto the piston shifts it forward to the right, first compressing spring 41 to some extent and through it forcing on the brakes with elastic effect. As the piston moves on the valve draws back, if the cam is permitted to rest, shutting off the air, or partly so, and graduating the action of the brake. Further movement of the cam by further movement of crank 14 toward the middle position will open valve 38 and admit more air for further application of the brake. Full throw of the cam will open the valve wide and put the brakes on with full force. By turning the cam backward the valve will be drawn back and escape for the air from the brake-cylinder will be opened by ports 61 in the end of the valve. In case it is desired to apply the brakes with full force in an emergency, as to avoid a collision, opening the solenoid-circuit by switch $56^f$ will have this effect through the action of spring 59, and in addition thereto the motors may then be reversed without releasing the brakes. A collar 90 on the valve-rod limits the forward movement by the valve. A stud 62 is attached to piston 41 to contact with piston 42 to limit compression of the spring 41.

For supplying the compressed air any approved compressing-pump may be used; but I have herein represented an electric pump whereof the cylinder 63 is also the cylinder of a solenoid and the piston 64 is the solenoid-core, with suitable inlet-valves 65 and outlet-valves 66 and ports provided for taking in the air and delivering it into the tank. A strainer 67 is placed over the mouth of each inlet to exclude the dust. The solenoid has a middle coil 68, always energized while the pump is working, and end coils 69 and 70, which are alternately energized and deënergized to operate the compressing-core piston. These coils are connected in the branch circuit 71 72 of the controlling-circuit $18^b$ and $18^c$, having a circuit breaking and closing switch 94. 73 is the main wire of the middle coil 68, 74 the main wire of end coil 70, and 75 the main wire of end coil 69. The wires 74 and 75 connect through contacts 76 and 77, respectively, with which there is a switch 79, connected with the main wire 73 of the middle coil by a branch 80, and the switch is pivoted at 81 and connected by rod 82, which extends through a stuffing-box 83 in one end of the cylinder and enters an interior chamber 84 of the piston and has therein a head 85, against which the end walls of the chamber strike at the ends of the strokes of the pistons, respectively, to reverse the current through the end coils of the solenoid and reciprocate the piston. A corrugated spring 91 is arranged in connection with switch 79 to hold it on the contacts 76 and 77.

It is desirable to control the supply of compressed air in the tank 35 automatically to insure a competent supply at all times without special attention; but provision must be made to prevent overpressure in the tank and such reduction of the speed as would endanger the burning out of the coils. I have therefore provided an automatic stop device in which a main wire 86 of a stop-circuit terminates in a fixed contact 87, located in suitable proximity to a contact 88, that is movable by a diaphragm subject to the air-pressure in the tank, to which contact the return-wire 89 of said stop-circuit is connected. This wire is connected with a relay-magnet 90, of which the anchor $91^a$, to which the return-wire 92 of the solenoid-coils is connected, is normally in contact with contact 93 of the return circuit-wire 72; but when pressure in the tank 35 closes contacts 87 and 88 magnet 90 is energized, and it attracts anchor 91ª away from contact 93 and breaks the solenoid-circuits. When the pressure falls in the tank and contacts 87 and 88 separate, the anchor 91 again closes the contacts of the solenoid return-wire and sets the pump in motion.

Figure 1:
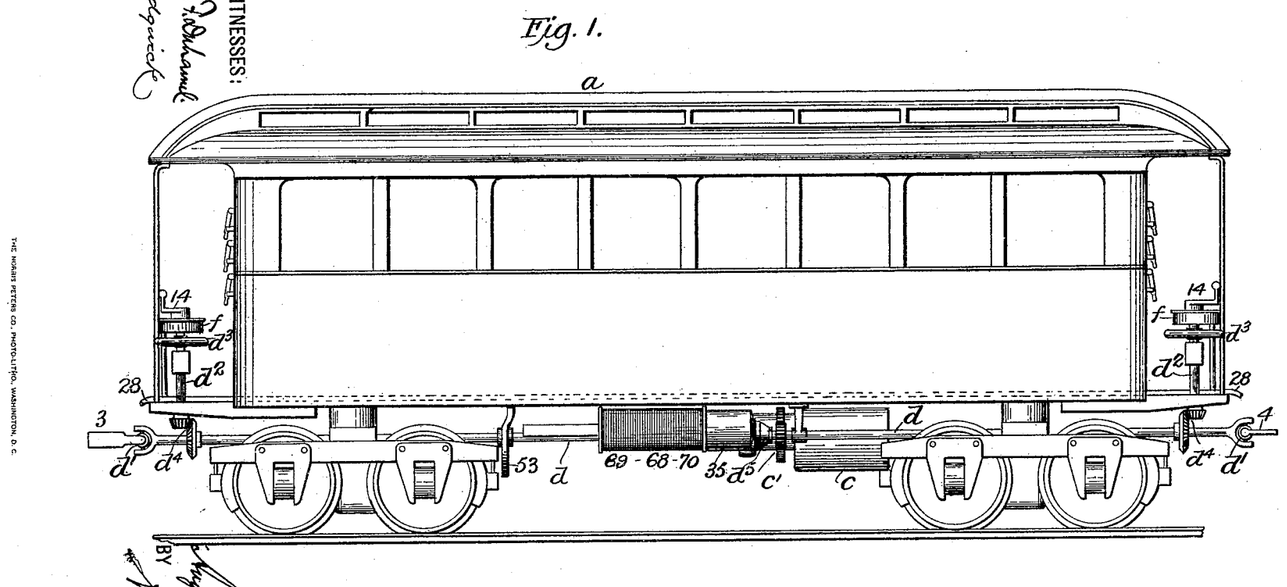
Figure 1 is a side elevation of an electric car equipped with my improved governor apparatus.
Figure 2:
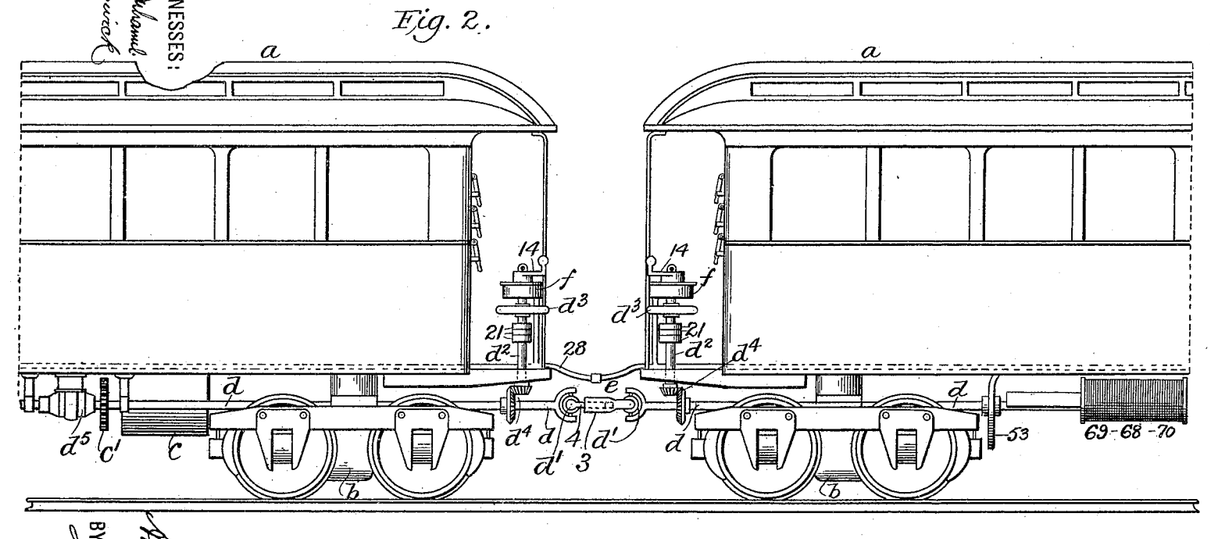
Fig. 2 is a similar elevation of the adjacent portions of two of the cars coupled together to constitute part of a train.

For convenience in closing and opening the controlling-circuit and also the pump and brake circuits at will the switches of the respective circuits 20ᵈ, 94, and 56ᶠ will be located in suitable proximity to the governor, as indicated in Figs. 1, 2, and 15, to be subject to control of the motorman in his stand by the governor.

Figure 3:
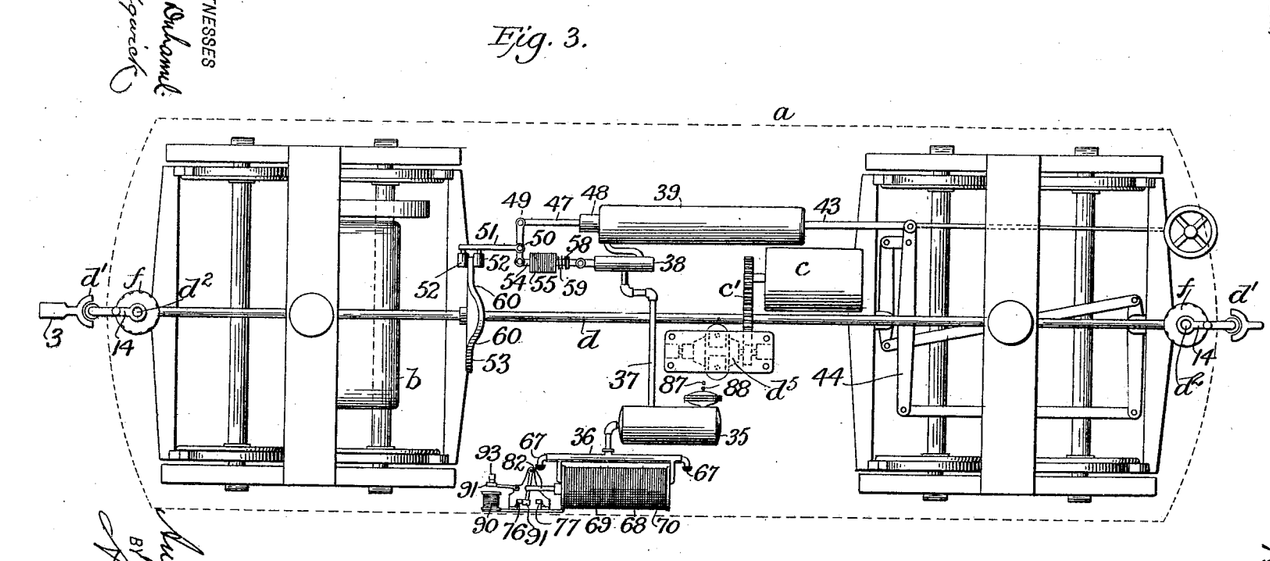
Fig. 3 is a top view in which the car-body is indicated only in dotted lines.
Figure 12:
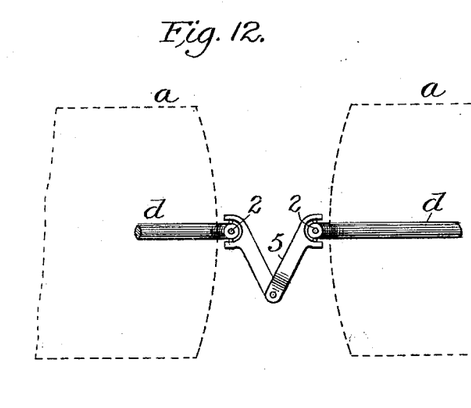
Figs. 12 and 13 represent different forms of flexible shaft-couplings for connecting shafts between cars.
Figure 13:
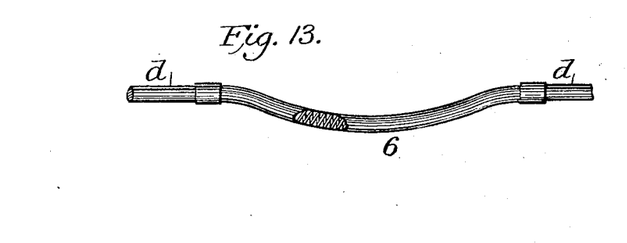

In Figs. 1, 2, and 3 the couplings $d'$ of the train-shaft are represented as universal joints on each end of each shaft $d$, with a socket 3 of one joint and a stem 4 of the other, the stem being inserted in the socket; but articulated links 5, as in Fig. 12, or a section of flexible shaft, as 6, Fig. 13, or any other equivalent connection may be used.

What I claim as my invention is—

1. The combination with an electric motor and its barrel-switch, of a motor for actuating the switch, a governor for the switch-actuating motor, and mechanism connecting said switch-actuating motor and governor for unity of action.

2. The combination with an electric motor and its barrel-switch, of a motor actuating the switch, a governor for the said motor, mechanism connecting said barrel-switch and governor for unity of action, said mechanism adapted for mechanically operating the motor-switch.

3. The combination with an electric motor and its barrel-switch, of a motor actuating the switch, a governor for the switch-actuating motor, and mechanism connecting said barrel-switch and governor for unity of action, said mechanism adapted to be manually operated.

4. In electric-car-operating mechanism, the combination of a plurality of cars in a train, electric motors and barrel-switches for said cars respectively, a barrel-switch-actuating motor or motors in one or more cars, means for actuating the plurality of barrel-switches by any one or more of said barrel-switch-actuating motors, and means for governing said barrel-switch-actuating motor or motors from either one or a plurality of the cars of the train.

5. In electric-car-operating mechanism the combination of a plurality of cars in a train, electric motors and barrel-switches for said cars, one or more motors for actuating the barrel-switches, one or more governors for the barrel-switch-actuating motor or motors, and mechanism connecting said barrel-switches and governor or governors for unity of action of the governors and motor-switches.

6. In electric-car-operating mechanism the combination of a plurality of cars in a train, electric motors and barrel-switches for said cars, one or more motors for actuating the barrel-switches, one or more governors for the switch-actuating motors, and mechanism connecting said barrel-switch or barrel-switches and governor or governors for unity of action of the governors and barrel-switches, said mechanism adapted for mechanically operating the barrel-switches.

7. In electric-car-operating mechanism the combination of a plurality of cars in a train, electric motors and barrel-switches for said cars, one or more motors for actuating the barrel-switches, one or more governors for controlling the barrel-switches of the several cars, and mechanism connecting said barrel-switches and governors for unity of action of the governors and barrel-switches, said mechanism adapted to be manually operated.

8. In electric-car-operating mechanism the combination of a plurality of cars in a train, electric motors and barrel-switches for said cars, one or more motors for actuating the barrel-switches, one or more governors for the switch-actuating motor or motors, and a train-shaft connecting said motor or motors, governor or governors, and barrel-switches.

9. The combination with an electric motor and its barrel-switch, of the train-shaft geared with said barrel-switch for actuating it, means for actuating the train-shaft, duplicate sets of contacts respectively located on opposite sides of an intermediate space on the drum of the barrel-switch, the reversing-switch located adjacent to the position of said intermediate space when the drum is in the center position, and means connecting said switch and the drum-shaft to automatically shift the switch and reverse the current when the drum is shifted from one side to the other for closing the controller-contacts.

10. In an electric-car-operating mechanism, the combination of a plurality of cars in a train, electric motors and barrel-switches for said motors, the train-shaft geared with the plurality of barrel-switches for actuating them, means for actuating the train-shaft, duplicate sets of contacts respectively located on opposite sides of an intermediate space on the drums of the barrel-switches, the reversing-switches located adjacent to the positions of said intermediate spaces when the drums are in the center positions and means connecting said switches and the drum-shafts to automatically shift the switches and reverse the current when the drums are shifted from one side to the other for closing the controller-contacts.

11. The combination with the motor, for actuating the barrel-switch, of the governor consisting of the insulated rotating contact-strips geared with the said motor, said strips having the reverse laterally-projecting extremities and a gap intermediate of said extremities, the crank pivoted on said shaft so as to swing around the strips, and the switch pivoted on the crank-handle hub to swing across the plane of the strips through the gap, said switch being connected in a supply-circuit and the contact-strips being respectively connected in series with the said motor for reversely operating it.

12. The combination with the motor for actuating the barrel-switch, of the governor consisting of the insulated rotating contact-strips geared with the train-shaft and operated by the said motor, said strips having the reverse laterally-projecting extremities, and a gap intermediate of said extremities, the crank-handle pivoted on said shaft, and the switch pivoted on the crank-handle hub to swing across the plane of the strips through the gap, said switch being connected in a supply-circuit and the contact-strips being respectively connected in series with the said motor for reversely operating it.

13. The combination with the barrel-switch and the motor for actuating it, of the governor consisting of the insulated contact-strips carried by a shaft geared with the said motor and barrel-switch, said strips having the reverse laterally-projecting extremities and a gap between said extremities, the crank-handle pivoted on said shaft so as to swing around the strips, the switch pivoted on the crank-handle hub to swing across the plane of the strips through the gap, said switch connected in a supply-circuit, and the contact-strips respectively connected with the said motor-fields for reversely operating it, the barrel-switch having duplicate sets of contacts respectively located on opposite sides of the drum for reversely directing the motor-current through the motor, and the governor having setting-points for the crank-handle on opposite sides of the middle position corresponding with the duplicate sets of contacts of the barrel-switch.

14. The combination with the motor for actuating a barrel-switch, of the contact-strips of the governor for said motor, geared with the said motor and having the circuit-breaking gap, and the governor-switch, said switch adapted to be set in different positions on the strips, and the strips adapted for the gap to follow the switch, and break the circuit.

15. The combination of the rotating strips of the governor and means for actuating them, said strips having the circuit-breaking gap, of the blow-out magnet located coincidently with the gap of said strips, and the switch, said switch and contact-strips being movable along each other respectively.

16. In an electric car the combination of the motor, barrel-switch, governor for the barrel-switch, air-brake, valve controlling the air-brake and means for controlling the air-brake valve through the instrumentality of said governor.

17. In an electric car the combination of the motor, barrel-switch, governor for the barrel-switch, air-brake, valve for controlling the air-brake through the instrumentality of the governor for the barrel-switch and being adapted to open the valve for applying the brake after the motor-circuit has been broken and to close the valve prior to closing the circuit.

18. In electric-car-operating mechanism, the combination of the motor, barrel-switch, governor for the barrel-switch, shaft connecting the governor and barrel-switch, air-brake, valve for controlling the air-brake, and means connecting the valve and shaft for controlling the valve through the instrumentality of the governor.

19. In electric-car-operating mechanism, the combination of a plurality of cars in a train, electric motors and barrel-switches for said cars, a motor in one or more cars for actuating the barrel-switches, a train-shaft operated by the barrel-switch-actuating motor or motors, and a plurality of air-brakes, and brake-controlling valves, the valves of the said brakes connected with the train-shaft to be operated thereby.

20. In electric-car-operating mechanism, the combination of a plurality of cars in a train, electric motors and barrel-switches for said cars, a motor in one or more cars for actuating the barrel-switches, a train-shaft operated by the said barrel-switch-actuating motor or motors, and a plurality of air-brakes, the valves of the said brakes connected with the train-shaft to be rotated thereby, said shaft also adapted to be operated by hand when the motor-circuit is broken.

21. The combination with the pilot-motor armature-shaft, and the brake-armature thereon, of the brake-magnet having the reversely-wound coils respectively connected in the main motor-circuit, and the governing-circuit, to energize the magnet by the governing-circuit and apply the brake when the main current is shut off.

22. In electric-car-operating mechanism, the combination of a plurality of cars in a train, electric motors for operating said cars, a train-shaft and a governor for controlling the motors, a plurality of air-brakes, and brake-controlling valves, said valves connected with the train-shaft for being operated thereby, a solenoid-coupling in the rod connecting the valve to its operating-lever, and being subject to an energizing-current when the train is running, to maintain the connection of the coupling parts, and adapted to release the valve when deënergized, and means to automatically open the released valve and apply the brakes.

23. In electric-car-operating mechanism, the combination of a plurality of cars in a train, electric motors for operating the cars, a train-shaft and a governor for controlling the motors, a plurality of air-brakes and brake-controlling valves, said valves connected with the train-shaft for being operated thereby, and also connected with the brake-piston for checking and regulating the opening by said train-shaft and for retracting the valve to close the inlet and open the exhaust to graduate the application of the brake.

24. In electric-car-operating mechanism, the combination of a plurality of cars in a train, electric motors for operating the cars, a train-shaft and governor for controlling the motors, a plurality of air-brakes and brake-controlling valves, said valves connected with the train-shaft for being operated thereby and also connected with the brake-piston for checking and regulating the opening by the train-shaft, said piston consisting of two parts, one of which is connected to the brake-rod and the other is connected to the valve, with a compression-spring intermediate of said parts to graduate the action on the brakes.

25. In electric-car-operating mechanism, the combination of a motor for operating the car, air-brake mechanism, a valve for controlling the brake, a manually-operated governor for controlling the motor, and connections between said valve and said governor whereby said governor controls the brake when the motor-circuit is interrupted by the governor.

26. In electric-car-operating mechanism, the combination of a motor for operating the car, air-brake mechanism, a valve for controlling the brake, a manually-operated governor for controlling the motor, and connections between said valve and said governor, whereby the range of movement of the valve may be varied for service stops and emergency stops according as the governor is manually operated.

27. In electric-car-operating mechanism, the combination of a motor for operating the car, a manually-operated governor for controlling the car-operating motor, air-brake, valve for controlling the air-brake, connections between said valve and said governor whereby said valve may be operated by said governor when the motor-circuit is interrupted by the governor, and means to disconnect the brake-valve and apply full force for emergency stops, said governor and motor adapted for reversing the motion at the same time without releasing the brake.

Signed by me at New York, N. Y., this 9th day of December, 1899.

AUGUST SUNDH.

Witnesses:
   A. P. THAYER,
   C. SEDGWICK.